United States Patent [19]

Otsuka et al.

[11] Patent Number: 5,017,520

[45] Date of Patent: May 21, 1991

[54] FLUOROSPHOSPHATE OPTICAL GLASS

[75] Inventors: Masaaki Otsuka; Masayuki Komiya; Naruhito Sawanobori, all of Yono; Shinobu Nagahama, Kasukabe, all of Japan

[73] Assignee: Sumita Optical Glass, Inc., Tokyo, Japan

[21] Appl. No.: 445,991

[22] Filed: Nov. 22, 1989

[30] Foreign Application Priority Data

Dec. 1, 1988 [JP] Japan ................. 63-304621

[51] Int. Cl.$^5$ .................. C03C 3/247; C03C 3/17; C03C 4/00

[52] U.S. Cl. ........................ 501/44; 501/902

[58] Field of Search ................... 501/44, 902

[56] References Cited

U.S. PATENT DOCUMENTS

| | | | |
|---|---|---|---|
| 3,847,624 | 11/1974 | Broemer et al. | 501/902 |
| 4,427,784 | 1/1984 | Nakamura et al. | 501/903 |
| 4,808,556 | 2/1989 | Sawanobori et al. | 501/902 |
| 4,857,487 | 8/1989 | Broemer et al. | 501/902 |
| 4,859,635 | 8/1989 | Meinert et al. | 501/902 |

*Primary Examiner*—Mark L. Bell
*Attorney, Agent, or Firm*—Wenderoth, Lind & Ponack

[57] ABSTRACT

A fluorophosphate optical glass having optical constants, i.e. a refractive index of 1.45 to 1.54 and an Abbe number of 75 to 90, preferably 75 to 89.5, useful as a lens for an optical instrument to obtain a good quality image, is provided, which has a chemical composition (% by mole) comprising:

| | |
|---|---|
| $P_2O_5$ | 6.8–19.0% |
| $Al_2O_3$ | 1.5–6.0% |
| BaO | 0.3–6.6% |
| $AlF_3$ | 16.6–26.3% |
| $MgF_2$ | 2.5–19.0% |
| $CaF_2$ | 8.0–28.0% |
| $SrF_2$ | 9.7–35.0% |
| $BaF_2$ | 7.9–35.0% |
| NaF | 0.5–4.0% |
| $Gd_2O_3$ | 1.0–6.0% |
| $Y_2O_3$ | 0–3.5% |
| $La_2O_3$ | 0–3.5% |
| $Yb_2O_3$ | 0–3.5% |
| sum of $Gd_2O_3$, $Y_2O_3$, $La_2O_3$ and $Yb_2O_3$ | 1.0–6.0% |
| $GdF_3$ | 0–2.0% |
| CaO | 0–3.5% |
| SrO | 0–3.5% |
| ZnO | 0–3.5% |
| MgO | 0–3.5% |

3 Claims, No Drawings

FLUOROSPHATE OPTICAL GLASS

BACKGROUND OF THE INVENTION

1. Field of the Invention

This invention relates to a fluorophosphate optical glass having optical constants, i.e. a refractive index (nd) of 1.45 to 1.54 and Abbe number ($\nu d$) of 75 to 90. The optical glass of the present invention, having a relatively large refractive index and large Abbe number, is useful as a lens for an optical instrument to obtain an image of good quality.

2. Description of the Prior Art

Introduction of fluorine into a glass composition is essential for obtaining an optical glass of low dispersion. Furthermore, it is also necessary to introduce a phosphate as a glass-forming material so as to stabilize the glass. Such an optical glass has been known as disclosed in Japanese Patent Publication No. 7430/1957. However, the fluorophosphate optical glass of the prior art cannot avoid fluctuation of the optical constants and striae due to vaporization of fluorine. In order to solve this problem, for example, an optical glass has been proposed which is capable of maintaining a lower vaporization of fluorine, as disclosed in Japanese Patent Publication No. 12857/1986.

In the known optical glasses, it has been proposed to introduce an alkali metal metaphosphate and melt at a low temperature for the purpose of improving the stability, for example, as in a glass composition comprising 8 to 11% of $Al(PO_3)_3$, 0.5 to 5% of $MPO_3$, 5 to 25% of $BaF_2$, 10 to 35% of $SrF_2$, 5 to 30% of $CaF_2$, 5 to 20% of $MgF_2$, 13 to 30% of $AlF_3$ and 0 to 10% of $LaF_3$, wherein M is at least one member selected from the group consisting of Li, Na and K and % is to be taken as that by mole, as disclosed in Japanese Patent Publication No. 12857/1986. However, the use of such an alkali metal metaphosphate results in contamination with more impurities such as water causing vaporization of fluorine than when using other metaphosphates. Thus, these optical glasses have problems in the production or processing thereof such that fluorine tends to vaporize so that fluctuation of the optical constants and striae takes place and the chemical durability is relatively low due to the chemical composition.

SUMMARY OF THE INVENTION

It is an object of the present invention to provide a fluorophosphate optical glass having a relatively large refractive index and Abbe number.

It is another object of the present invention to provide a fluorophosphate optical glass of $P_2O_5$-$Al_2O_3$-$BaO$-$Gd_2O_3$-$AlF_3$-$RF_2$-$NaF$ (R: Mg, Ca, Sr, Ba) having a refractive index (nd) of 1.45 to 1.54 and an Abbe number ($\nu d$) of 75 to 90.

It is a further object of the present invention to provide a very stable fluorophosphate optical glass with less vaporization of fluorine, which can be produced on a commercial scale.

These objects can be attained by a fluorophosphate optical glass having optical constants, i.e. a refractive index (nd) of 1.45 to 1.54 and Abbe number ($\nu d$) of 75 to 90, which has a chemical composition (% by mole) comprising 6.8 to 19.0% of $P_2O_5$, 1.5 to 6.0% of $Al_2O_3$, 0.3 to 6.6% of $BaO$, 16.6 to 26.3% of $AlF_3$, 2.5 to 19.0% of $MgF_2$, 8.0 to 28.0% of $CaF_2$, 9.7 to 35.0% of $SrF_2$, 7.9 to 35.0% of $BaF_2$, 0.5 to 4.0% of $NaF$, 1.0 to 6.0% of $Gd_2O_3$, 0 to 3.5% of $Y_2O_3$, 0 to 3.5% of $La_2O_3$, 0 to 3.5% of $Yb_2O_3$, the sum of $Gd_2O_3$, $Y_2O_3$, $La_2O_3$ and $Yb_2O_3$ being 1.0 to 6.0% and 0 to 2.0 % of $GdF_3$, 0 to 3.5% of $CaO$, 0 to 3.5% of $SrO$, 0 to 3.5% of $ZnO$ and 0 to 3.5% of $MgO$.

DETAILED DESCRIPTION OF THE INVENTION

The inventors have made various efforts to overcome the disadvantages of the prior art fluorophosphate optical glasses, as described above, and consequently, have found that a glass of $P_2O_5$-$Al_2O_3$-$BaO$-$Gd_2O_3$-$AlF_3$-$RF_2$-$NaF$ (R: Mg, Ca, Sr, Ba) comprising NaF as an essential component to obtain better effects than alkali metal metaphosphate, and $Gd_2O_3$ as an essential component to improve the durability and workability, is capable of attaining the object of the present invention.

Accordingly, the present invention provides a novel fluorophosphate optical glass having optical constants, i.e. a refractive index of 1.45 to 1.54 and an Abbe number of 75 to 90, preferably 75 to 89.5, which has a chemical composition (% by mole) comprising:

| | |
|---|---|
| $P_2O_5$ | 6.8–19.0%, preferably 7.0–18.0% |
| $Al_2O_3$ | 1.5–6.0%, preferably 1.5–5.0% |
| $BaO$ | 0.3–6.6%, preferably 0.5–6.0% |
| $AlF_3$ | 16.6–26.3%, preferably 16.6–25.0% |
| $MgF_2$ | 2.5–19.0%, preferably 3.5–17.0% |
| $CaF_2$ | 8.0–28.0%, preferably 9.0–25.0% |
| $SrF_2$ | 9.7–35.0%, preferably 10.0–33.0% |
| $BaF_2$ | 7.9–35.0%, preferably 10.0–34.0% |
| $NaF$ | 0.5–4.0%, preferably 0.5–3.0% |
| $Gd_2O_3$ | 1.0–6.0%, preferably 1.0–4.5% |
| $Y_2O_3$ | 0–3.5% |
| $La_2O_3$ | 0–3.5% |
| $Yb_2O_3$ | 0–3.5% |
| sum of $Gd_2O_3$, $Y_2O_3$, $La_2O_3$ and $Yb_2O_3$ | 1.0–6.0%, preferably 1.0–5.0% |
| $GdF_3$ | 0–2.0% |
| $CaO$ | 0–3.5% |
| $SrO$ | 0–3.5% |
| $ZnO$ | 0–3.5% |
| $MgO$ | 0–3.5% |

The grounds for limiting the proportion ranges of the components to the foregoing are as follows:

$P_2O_5$ is a component for forming the glass and is in a proportion of 6.8 to 19.0%, since if outside the above described range, the intended optical constants cannot be obtained.

$Al_2O_3$ is a component for increasing the viscosity of the glass and preventing crystallization therefrom and is in a proportion of 1.5 to 6.0%, since if less than 1.5%, this effect is markedly decreased, while if more than 6.0%, melting of the glass is difficult and the crystallization tendency is increased.

BaO is a component required for lowering the liquidus temperature and improving the stability of the glass and is in a proportion of 0.3 to 6.6%, since if outside this range, the intended optical constants cannot be obtained.

$AlF_3$ is a component for easy formation of the glass and lowering the dispersion and is in a proportion of 16.6 to 26.3%, since if outside this range, the intended optical constants cannot be obtained.

$MgF_2$ is in a proportion of 2.5 to 19.0%, since if outside this range, the glass tends to be crystallized and becomes unstable.

$CaF_2$ is in a proportion of 8.0 to 28.0%, since if more than 28.0%, the glass tends to be crystallized, while if less than 8.0%, the glass becomes unstable.

$SrF_2$ is in a proportion of 9.7 to 35.0%, since if more than 35.0%, the glass tends to be crystallized, while if less than 9.7%, the melting property is deteriorated so that the glass will be unstable.

$BaF_2$ is in a proportion of 7.9 to 35.0%, since if more than 35.0%, the crystallization tendency is too increased to obtain the glass in a stable manner, while if less than 7.9%, the melting property is deteriorated so that the glass will be unstable.

NaF is a component for lowering the melting temperature of the glass and suppressing vaporization of fluorine and is in a proportion of 0.5 to 4.0%, since if less than 0.5%, this effect is too decreased, while if more than 4.0%, the glass is so unstable that the chemical durability is deteriorated.

$Gd_2O_3$ has an effect of raising the refractive index without raising the dispersion and serves largely to improve the workability and chemical durability of the glass. $Gd_2O_3$ should be added in a proportion of 1.0 to 6.0%, since if less than 1.0%, the above described effect is largely decreased, while if more than 6.0%, dissolving it in the glass is so hard that the crystallization tendency is increased.

$Y_2O_3$, $La_2O_3$ and $Yb_2O_3$ are optional components for increasing the viscosity of the glass and preventing it from crystallization and are respectively in a proportion of 0 to 3.5%, since if more than 3.5%, the melting temperature, vaporization of fluorine and crystallization tendency are increased.

If the sum of $Gd_2O_3$, $Y_2O_3$, $La_2O_3$ and $Yb_2O_3$ is less than 1.0%, the effect of raising the refractive index without raising the dispersion and improving the workability and chemical durability of the glass is decreased, while if more than 6.0%, the melting is too difficult and the crystallization tendency is too increased to obtain the glass.

$GdF_3$ is an optional component although having an effect similar to $Gd_2O_3$ and is in a proportion of 0 to 2.0%, since if more than 2.0%, the glass tends to be crystallized and becomes unstable.

CaO, SrO, ZnO and MgO are used, as optional components, for the purpose of lowering the liquidus temperature and easy glass formation, respectively in a proportion of 0 to 3.5%, since if exceeding 3.5%, the glass tends to be crystallized and becomes unstable.

In the present invention, it is preferable to add the oxides in the form of phosphates as much as possible so as to decrease the water content causing vaporization of fluorides.

Furthermore, the fluorides in the glass composition of the present invention can be replaced by several % of LiF and KF as far as the concept of the present invention is not lost.

Production of the fluorophosphate optical glass of the present invention can generally be carried out by mixing raw materials in a predetermined proportion to give the above described chemical composition, melting the mixture at a temperature of 900° C. to 1200° C., and then subjecting the melt to casting in a conventional manner.

The fluorophosphate optical glass of the present invention is very excellent in chemical durability as well as workability and can readily be produced in a stable manner on a commercial scale. The optical glass of the present invention is very promising, since when using the optical glass, having a low dispersion, as a lens for an optical instrument such as a camera, an optical system with less chromatic aberration can be designed to obtain a good quality image.

The following examples are given in order to illustrate the present invention in greater detail without limiting the same.

Raw materials used for the fluorophosphate optical glass of the present invention in the following examples are the corresponding metaphosphates, oxides and fluorides.

EXAMPLE 1

The proportions by weight % of the raw materials shown in Table 2, No. 1 were calculated from those by mole % of the glass components shown in Table 1 as No. 1. These raw materials were mixed in the predetermined proportions, melted at 900° to 1000° C. to be homogeneous and cast in a metal mold, thus obtaining the glass in a stable manner.

EXAMPLES 2 to 15

The raw materials Nos. 2 to 15 in Table 2 corresponding to the glass components Nos. 2 to 15 in Table 1 were melted in an analogous manner to Example 1, thus obtaining the glasses in a stable manner.

In Table 3 are shown the refractive indexes nd and Abbe numbers νd of the resulting glasses in Examples 1 to 15.

TABLE 1

| No. | (mol %) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| $P_2O_5$ | 14.5 | 12.1 | 8.5 | 8.0 | 9.3 | 14.7 | 8.5 | 11.5 | 13.6 | 16.5 | 12.4 | 11.6 | 13.4 | 6.9 | 17.4 |
| $Al_2O_3$ | 3.5 | 1.5 | 1.5 | 2.0 | 2.7 | 3.5 | 2.5 | 3.5 | 4.3 | 5.1 | 3.3 | 3.3 | 4.1 | 2.2 | 4.5 |
| BaO | 1.0 | 6.6 | 4.0 | 1.0 | 1.2 | 2.2 | 1.0 | 1.0 | 0.8 | 1.2 | 0.7 | 1.7 | 1.2 | 0.3 | 3.8 |
| $AlF_3$ | 22.0 | 22.8 | 25.0 | 25.5 | 26.0 | 19.0 | 25.1 | 22.3 | 16.6 | 17.8 | 23.0 | 19.7 | 17.8 | 26.2 | 16.8 |
| $MgF_2$ | 7.0 | 3.0 | 10.7 | 17.0 | 7.6 | 15.0 | 15.0 | 6.7 | 4.8 | 3.9 | 3.7 | 4.8 | 3.9 | 14.6 | 3.2 |
| $CaF_2$ | 14.0 | 10.5 | 20.8 | 10.0 | 16.4 | 15.0 | 20.0 | 10.5 | 10.5 | 8.3 | 14.3 | 8.4 | 8.3 | 27.9 | 8.0 |
| $SrF_2$ | 20.0 | 17.3 | 15.5 | 10.0 | 19.0 | 11.6 | 12.0 | 20.6 | 25.3 | 13.0 | 12.4 | 11.2 | 32.7 | 9.7 | 20.2 |
| $BaF_2$ | 12.0 | 19.2 | 10.5 | 22.0 | 14.3 | 12.1 | 10.0 | 18.1 | 18.3 | 29.9 | 23.4 | 33.9 | 13.5 | 7.9 | 21.4 |
| NaF | 0.5 | 1.0 | 1.0 | 1.2 | 1.7 | 2.4 | 2.9 | 1.5 | 1.1 | 3.2 | 1.3 | 1.8 | 3.2 | 3.0 | 0.5 |
| $GdF_3$ | | | | | | | | 0.9 | | | | | | | |
| $Gd_2O_3$ | 2.5 | 3.0 | 1.3 | 2.3 | 1.8 | 2.5 | 2.0 | 3.4 | 1.2 | 1.1 | 5.5 | 3.6 | 1.9 | 1.0 | 4.2 |
| $Y_2O_3$ | | | | | | | | | 3.5 | | | | | 0.3 | |
| $La_2O_3$ | | | | | | | 1.0 | | | | | | | | |
| $Yb_2O_3$ | | | | | | 2.0 | | | | | | | | | |
| CaO | 3.0 | | | | | | | | | | | | | | |
| MgO | | 3.0 | | | | | | | | | | | | | |
| SrO | | | 1.2 | | | | | | | | | | | | |
| ZnO | | | | 1.0 | | | | | | | | | | | |

TABLE 2

| No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | | | | | | (wt %) | | | | | | | | | |
| $Al(PO_3)_3$ | 15.9 | 6.3 | 7.3 | 9.1 | 12.6 | 15.6 | 12.4 | 14.8 | 17.9 | 21.2 | 13.1 | 12.9 | 17.7 | 12.0 | 17.4 |
| $Ba(PO_3)_2$ | 2.5 | 15.5 | 10.9 | 2.6 | 3.1 | 5.5 | 2.8 | 2.4 | 1.9 | 2.6 | 1.4 | 3.6 | 2.7 | 0.9 | 8.3 |
| $AlF_3$ | 15.9 | 15.2 | 19.5 | 18.5 | 19.3 | 13.5 | 19.8 | 15.0 | 11.0 | 11.7 | 14.6 | 12.2 | 12.3 | 22.8 | 10.4 |
| $MgF_2$ | 3.7 | 1.5 | 6.2 | 9.2 | 4.2 | 7.9 | 8.8 | 3.3 | 2.3 | 1.7 | 1.8 | 2.2 | 2.0 | 9.4 | 1.5 |
| $CaF_2$ | 9.4 | 6.5 | 15.1 | 6.8 | 11.3 | 9.9 | 14.7 | 6.5 | 6.5 | 5.0 | 8.5 | 4.8 | 5.3 | 22.5 | 4.6 |
| $SrF_2$ | 21.5 | 17.3 | 18.0 | 10.9 | 21.1 | 12.3 | 14.1 | 20.7 | 25.1 | 12.7 | 11.9 | 10.4 | 33.7 | 12.5 | 18.7 |
| $BaF_2$ | 18.0 | 26.7 | 17.1 | 33.4 | 22.1 | 17.9 | 16.4 | 25.4 | 25.3 | 41.0 | 31.2 | 43.9 | 19.3 | 14.3 | 27.7 |
| NaF | 0.2 | 0.3 | 0.4 | 0.4 | 0.6 | 0.8 | 1.2 | 0.5 | 0.4 | 1.0 | 0.4 | 0.6 | 1.1 | 1.3 | 0.2 |
| $GdF_3$ | | | | | | | | | 1.8 | | | | | | |
| $Gd_2O_3$ | 7.8 | 8.6 | 4.4 | 7.2 | 5.7 | 7.6 | 6.8 | 9.9 | 3.4 | 3.0 | 10.0 | 9.5 | 5.9 | 3.7 | 11.2 |
| $Y_2O_3$ | | | | | | | | | | 6.2 | | | | 0.7 | |
| $La_2O_3$ | | | | | | | | | 3.0 | | | | | | |
| $YbPO_4$ | | | | | | 9.0 | | | | | | | | | |
| $Ca(PO_3)_2$ | 5.1 | | | | | | | | | | | | | | |
| $Mg_3(PO_4)_2$ | | 2.1 | | | | | | | | | | | | | |
| SrO | | | 1.1 | | | | | | | | | | | | |
| $Zn(PO_3)_2$ | | | | 1.9 | | | | | | | | | | | |
| $GdPO_4$ | | | | | | | | | | | | 7.1 | | | |

TABLE 3

| No. | 1 | 2 | 3 | 4 | 5 | 6 | 7 | 8 |
|---|---|---|---|---|---|---|---|---|
| nd | 1.5054 | 1.5097 | 1.4740 | 1.4779 | 1.4800 | 1.5116 | 1.4750 | 1.5011 |
| νd | 81.0 | 80.7 | 86.7 | 85.2 | 86.0 | 79.3 | 85.7 | 82.1 |

| No. | 9 | 10 | 11 | 12 | 13 | 14 | 15 |
|---|---|---|---|---|---|---|---|
| nd | 1.5015 | 1.5058 | 1.5181 | 1.5037 | 1.4950 | 1.4539 | 1.5304 |
| νd | 82.9 | 82.3 | 79.3 | 82.0 | 82.3 | 89.5 | 77.0 |

What is claimed is:

1. A fluorophosphate glass having a refractive index of 1.45 to 1.54 and an Abbe number of 75 to 90, which has a chemical composition, in % by mole, comprising:

| | |
|---|---|
| $P_2O_5$ | 6.8–19.0% |
| $Al_2O_3$ | 1.5–6.0% |
| BaO | 0.3–6.6% |
| $AlF_3$ | 16.6–26.3% |
| $MgF_2$ | 2.5–19.0% |
| $CaF_2$ | 8.0–28.0% |
| $SrF_2$ | 9.7–35.0% |
| $BaF_2$ | 7.9–35.0% |
| NaF | 0.5–4.0% |
| $Gd_2O_3$ | 1.0–6.0% |
| $Y_2O_3$ | 0–3.5% |
| $La_2O_3$ | 0–3.5% |
| $Yb_2O_3$ | 0–3.5% |
| sum of $Gd_2O_3$, $Y_2O_3$, $La_2O_3$ and $Yb_2O_3$ | 1.0–6.0% |
| $GdF_3$ | 0–2.0% |
| CaO | 0–3.5% |
| SrO | 0–3.5% |
| ZnO | 0–3.5% and |
| MgO | 0–3.5%. |

2. A fluorophosphate optical glass according to claim 1, having an Abbe number of 75 to 89.5.

3. A fluorophosphate optical glass having a refractive index of 1.45 to 1.54 and an Abbe number of 75 to 89.5, which has a chemical composition, in % by mole, comprising:

| | |
|---|---|
| $P_2O_5$ | 7.0–18.0% |
| $Al_2O_3$ | 1.5–5.0% |
| BaO | 0.5–6.0% |
| $AlF_3$ | 16.6–25.0% |
| $MgF_2$ | 3.5–17.0% |
| $CaF_2$ | 9.0–25.0% |
| $SrF_2$ | 10.0–33.0% |
| $BaF_2$ | 10.0–34.0% |
| NaF | 0.5–3.0% |
| $Gd_2O_3$ | 1.0–4.5% |
| $Y_2O_3$ | 0–3.5% |
| $La_2O_3$ | 0–3.5% |
| $Yb_2O_3$ | 0–3.5% |
| sum of $Gd_2O_3$, $Y_2O_3$, $La_2O_3$ and $Yb_2O_3$ | 1.0–5.0% |
| $GdF_3$ | 0–2.0% |
| CaO | 0–3.5% |
| SrO | 0–3.5% |
| ZnO | 0–3.5% and |
| MgO | 0–3.5%. |

* * * * *